US007131399B2

(12) United States Patent
Blommel

(10) Patent No.: US 7,131,399 B2
(45) Date of Patent: Nov. 7, 2006

(54) ANIMAL RESTRAINT

(76) Inventor: Ronald J. Blommel, 681 E. 16th Ave., Denver, CO (US) 80203

( * ) Notice: Subject to any disclaimer, the term of this patent is extended or adjusted under 35 U.S.C. 154(b) by 0 days.

(21) Appl. No.: 10/830,636

(22) Filed: Apr. 22, 2004

(65) Prior Publication Data

US 2004/0211370 A1 Oct. 28, 2004

Related U.S. Application Data

(60) Provisional application No. 60/466,021, filed on Apr. 24, 2003.

(51) Int. Cl.
*A61D 3/00* (2006.01)
*A01K 13/00* (2006.01)

(52) U.S. Cl. ........................ 119/712; 119/751; 119/850

(58) Field of Classification Search ................ 119/497, 119/712, 725, 751, 792, 850, 856, 417; 54/79.1, 54/79.2; 2/256, 260
See application file for complete search history.

(56) References Cited

U.S. PATENT DOCUMENTS

| | | | | |
|---|---|---|---|---|
| 1,015,239 | A * | 1/1912 | Miller | 119/725 |
| 1,058,763 | A * | 4/1913 | Lack | 450/139 |
| 3,399,670 | A | 9/1968 | Veasey | |
| 4,137,870 | A * | 2/1979 | Cano | 119/712 |
| 4,644,902 | A * | 2/1987 | Doyle | 119/497 |
| 5,109,801 | A | 5/1992 | Gahagan | |
| 5,111,554 | A * | 5/1992 | Sweers | 24/16 R |
| 5,230,304 | A | 7/1993 | Santoro | |
| 5,309,866 | A * | 5/1994 | Santoro | 119/650 |
| 5,738,043 | A * | 4/1998 | Manuel | 119/497 |
| 5,762,027 | A * | 6/1998 | Freund | 119/672 |
| 5,839,393 | A * | 11/1998 | Rupp et al. | 119/712 |
| 5,970,921 | A * | 10/1999 | Fulton | 119/858 |
| 6,431,123 | B1 * | 8/2002 | Hibbert | 119/850 |
| 6,595,162 | B1 * | 7/2003 | Hibbert | 119/850 |

FOREIGN PATENT DOCUMENTS

GB 2 039 704 A * 8/1980

OTHER PUBLICATIONS

PCT International Search Report on Patentability and Written Opinion, PCT Application No. PCT/US04/12637, Nov. 18, 2005, 8 pages.

* cited by examiner

*Primary Examiner*—Robert P. Swiatek
(74) *Attorney, Agent, or Firm*—Krajec Patent Offices, LLC; Russell S. Krajec

(57) ABSTRACT

An animal restraint is comprised of a fabric panel with two elongated rigid members attached to two edges. A fastener system such as a hook and loop fastener system is attached to said panel and may be quickly secured by manipulating the two elongated rigid members. The fabric panel may be manufactured with an elastic material to hold the animal securely. A neck restraint may also be provided to secure the neck in addition to the body of the animal. An aperture may further be provided to allow access to portions of the body of the animal while the animal is restrained.

22 Claims, 6 Drawing Sheets

ANIMAL RESTRAINT

CROSS REFERENCE TO RELATED APPLICATIONS

This application claims the benefit of U.S. Provisional Patent Application 60/466,021 entitled "Small Animal Restraint" by Ronald J. Blommel filed Apr. 24, 2003, the entire content of which is hereby incorporated by reference herein for all it discloses and teaches.

BACKGROUND OF THE INVENTION a. Field of the Invention

The present invention pertains to animal restraint devices and specifically to animal restraint devices adapted for animals such as cats and dogs.

b. Description of the Background

Restraining animals, such as cats, is a necessary part of administering normal veterinarian care. Often, certain procedures such as administering intravenous or subcutaneous injections, trimming claws, observing and treating wounds, or other procedures requires that the animal be restrained so that the animal or the person performing the procedure is not injured.

It is sometimes standard practice in veterinary offices for an assistant to hold an animal while a procedure is performed. Often, a towel is used to encircle the animal while the assistant holds the animal for the procedure. In some cases, a scared and partially restrained animal may become highly agitated and injure itself or those humans attempting to care for the animal. In such cases, it may become necessary to partially or completely sedate the animal for the procedure. Anesthetics may have undesirable side effects or may add additional cost to the treatment of the animal. When anesthetics are not used, it is desirable to have the animal restrained quickly so that the animal does not struggle and fight its way free.

It is therefore advantageous to provide a system and method for restraining an animal quickly, safely and reliably. It would be further advantageous to provide access to various portions of the animal in the restraint so that different procedures may be performed.

DISCLOSURE OF THE INVENTION

The present invention overcomes the disadvantages and limitations of the prior art by providing an apparatus and method for restraining a small animal comprising a rigid bar attached to either side of a flexible material wherein at least a portion of the material is stretchable. A section of hook and loop material is attached to the flexible material parallel to and near the rigid bars. An animal such as a cat may be placed on the apparatus and secured by quickly closing the hook and loop material. The rigid bars attached to the material allow most of the hook and loop material to quickly engage and thus secure the animal. Additional straps may be used to completely secure the animal in the restraint.

The restraint may have one or more access points in the material section. The access points may comprise an opening or aperture whereby a portion of the animal's external surface may be directly contacted. In other embodiments, a zipper or secondary hook and loop closure may be used to provide an access point. The access point may be used for injections or other treatments for the animal.

An embodiment of the present invention may include an animal restraint comprising: a flexible panel having a first edge and a second edge, the first edge and second edge being substantially parallel; a first elongated rigid member supporting the flexible panel along at least a portion of the first edge; a second elongated rigid member supporting the flexible panel along at least a portion of a second edge; and a fastener system having a first portion attached to the flexible panel substantially adjacent to the first elongated rigid member and a second portion of the fastener system attached to the flexible panel substantially adjacent to the second elongated rigid member.

Another embodiment of the present invention may include a restraint for a small animal comprising: means for encircling a substantial portion of the body of the small animal; means for rigidly supporting a first edge of the means for encircling; means for rigidly supporting a second edge of the means for encircling; and means for removably securing the first edge of the means for encircling and the second edge of the means for encircling.

Yet another embodiment of the present invention may include a method for restraining a animal comprising: placing the animal onto a restraint comprising a flexible panel having a first edge and a second edge, the first edge and second edge being substantially parallel, a first elongated rigid member supporting the flexible panel along at least a portion of the first edge, a second elongated rigid member supporting the flexible panel along at least a portion of a second edge, and a fastener system having a first portion attached to the flexible panel substantially adjacent to the first elongated rigid member and a second portion of the fastener system attached to the flexible panel substantially adjacent to the second elongated rigid member; and fastening the first portion of the fastener system to the second portion of the fastener system to restrain the animal.

The advantages of the present invention are that an animal such as a dog or cat may be quickly and efficiently restrained. A single individual may place an animal in the restraint and secure the animal so that an assistant is not needed to perform some procedures. Access to portions of the animal's body may be gained through one or more apertures or access points provided in the restraint.

DETAILED DESCRIPTION OF THE INVENTION

Figure 1:
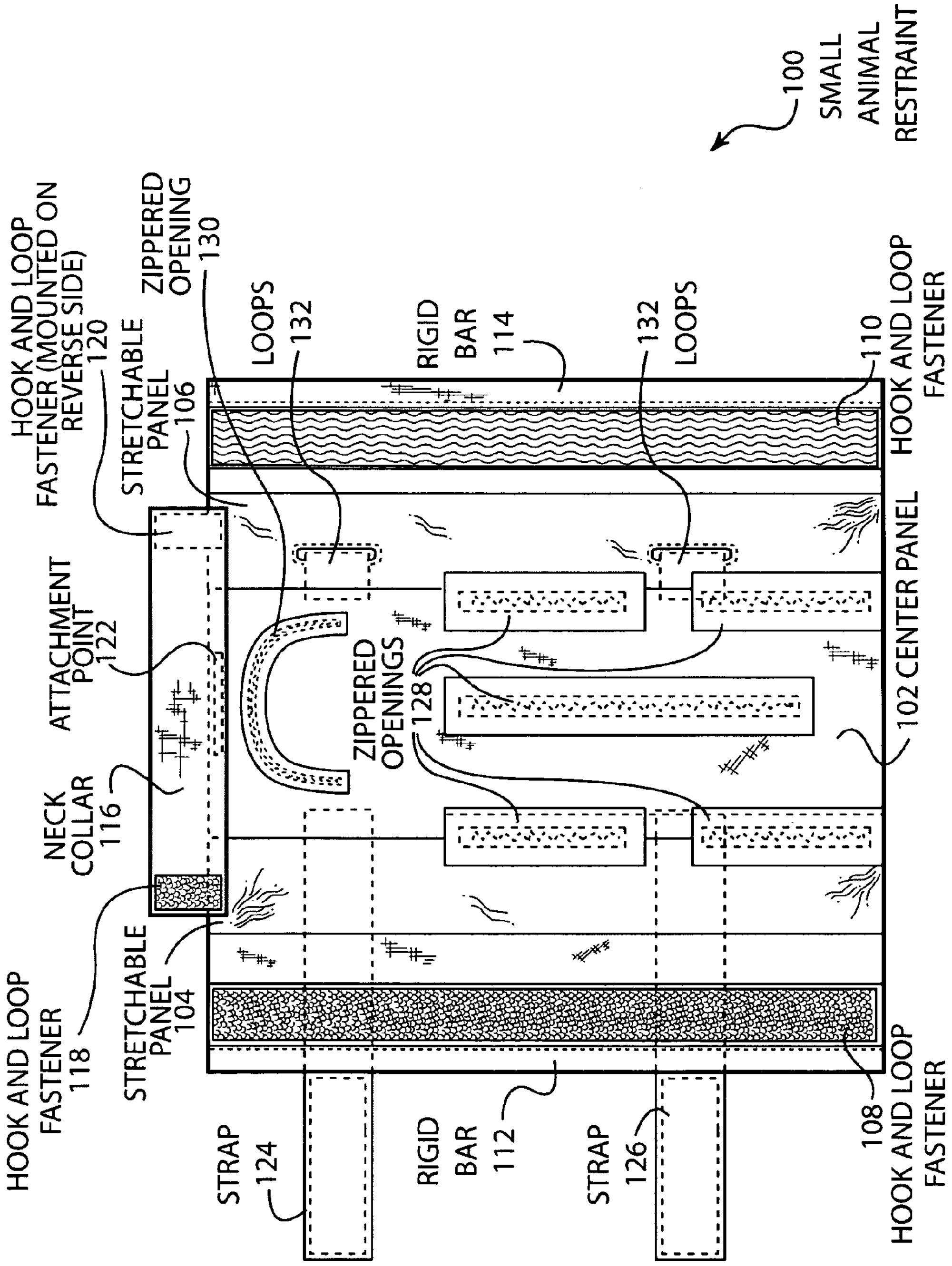
FIG. 1 is a top view illustration of a first embodiment of the present invention of an animal restraint.

FIG. 1 illustrates an embodiment 100 of the present animal restraint. A panel 102 is attached to stretchable panels 104 and 106. One portion 108 of a hook and loop fastener system and the complementary portion 110 are attached to panels next to the stretchable panels 104 and 106, respectively. Rigid bars 112 and 114 provide support to the otherwise conformable fabric material. An optional neck collar 116 is attached to the center panel 102 at attachment point 122. The neck collar 116 may be closed using hook and loop fasteners 118 and 120. Straps 124 and 126 may engage loops 132 in order to secure the animal after initially closing the embodiment 100. Several zippered openings 128 may be placed at various locations to allow for access to an animal while the animal is in the restraint 100. Zippered opening 130 may also be used to gain access to the animal.

The embodiment 100 may be used to restrain various animals. The embodiment 100 is particularly suited to restrain cats and small dogs, but may also be used to restrain birds, rodents, other mammals, reptiles, and other animals as needed. Those skilled in the art will appreciate that various sizes and shapes of restraints may be manufactured to restrain the appropriate animal while keeping within the spirit and intent of the present invention.

The restraint 100 may be manufactured from sewn woven materials. For example, center panel 102 may be a heavy weight nylon or denim material that is sewn to stretchable panels 104 and 106. The hook and loop fasteners 108 and 110 may likewise be sewn in place. Other types of materials and assembly techniques may be useful for particular embodiments that are directed at specific applications. For example, the center panel 102 may be manufactured from a flexible plastic sheet material and attached to other elements by adhesives, heat bonding, or mechanical mechanisms. The examples discussed herein are for exemplary purposes only and are meant to illustrate the principles of the invention while not limiting the invention to the precise forms described. Those skilled in the arts may select different materials and construction techniques suited for specific applications while keeping within the spirit and intent of the present invention.

The restraint 100 can be manufactured with at least one stretchable panel 104. The restraint 100 may encircle an animal and further may be stretched around the animal so that the animal is securely held. The stretchable panel 104 is preferably elastic and able to withstand a large amount of deformation. The more that the stretchable panels 104 and 106 may be stretched to restrain an animal, the more securely the animal may be held.

Rigid bars 112 and 114 may be sewn into or otherwise attached to the restraint 100. The rigid bars 112 and 114 allow a person to quickly engage the hook and loop fasteners 108 and 110 while holding the animal. The rigid bars 112 and 114 may be wooden dowels, hollow or solid plastic rods, hollow or solid metal bars, or any other generally rigid elongated rigid bodies that may serve to stiffen the edges of the restraint 100. In some embodiments, the restraint 100 may be a washable material. In such cases, the rigid bars 112 and 114 may be selected so that they may either be removable or may be able to survive a washing and disinfectant procedure without damage.

The optional neck collar 116 may be useful for securing the neck of the animal. In some embodiments, the neck collar 116 may be manufactured from a woven material and may have a plastic sheet attached to or inserted therein to stiffen the collar 116. If an insert is used, various sizes of inserts may be useful for adapting the restraint 100 to different sized animals or different species of animals.

The zippered openings 128 and 130 may be used to access various portions of an animal that is being restrained. The openings 128 and 130 may be used to access a portion of the animal's skin or fur for subcutaneous or intravenous injections, apply dressings, perform surgery, or any other procedure. Some of the openings 128 and 130 may be used to access a leg or appendage of an animal to clip nails or other procedures.

The zippered openings 128 and 130 may be of any shape or size. In some embodiments, the openings may be fastened using a hook and loop fastener, snaps, clips, or any other mechanical fastener. In some embodiments, one or more of the openings 128 and 130 may not have any fasteners.

Figure 2:
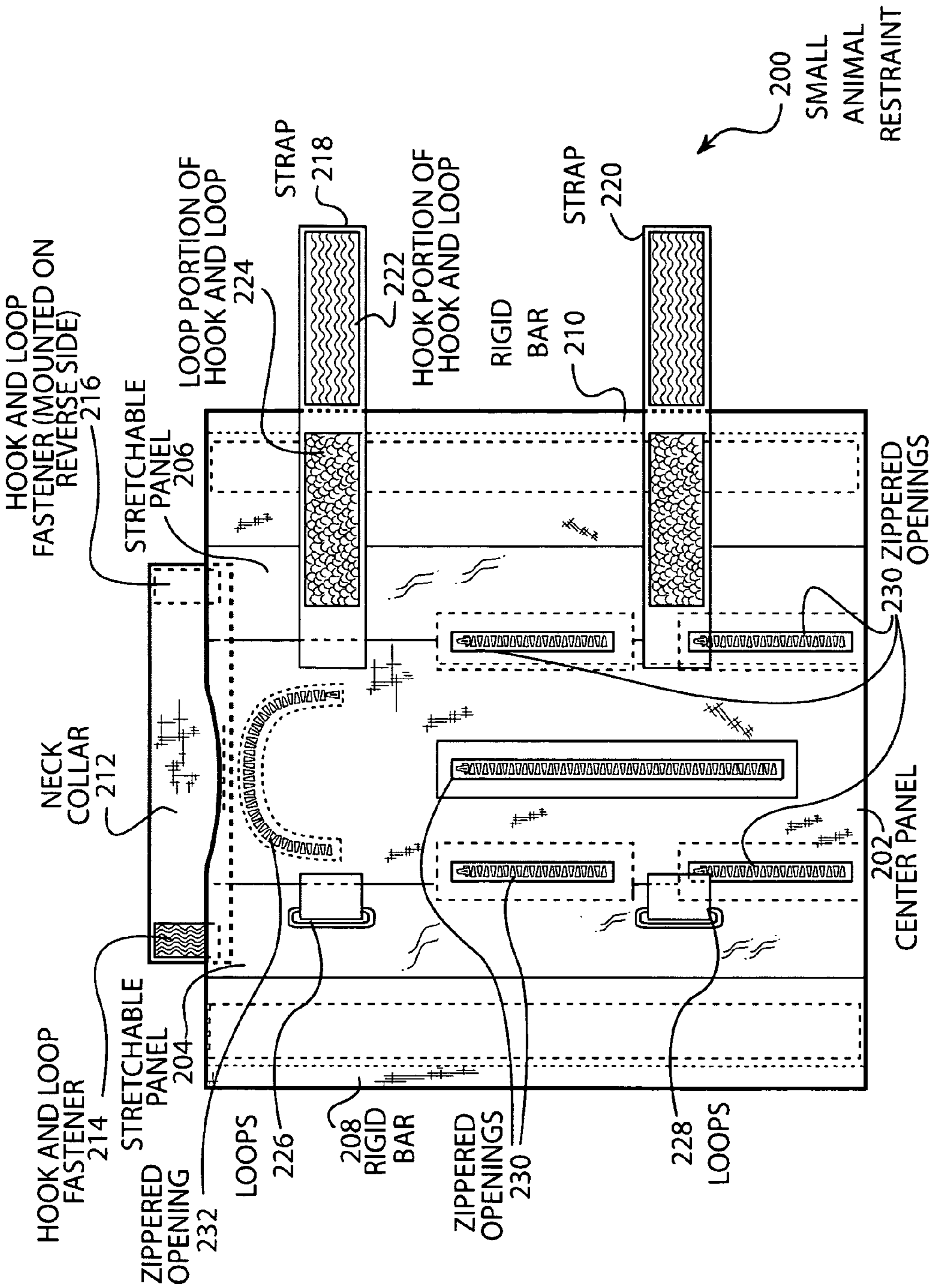
FIG. 2 is a bottom view illustration of the embodiment shown in FIG. 1.

FIG. 2 illustrates a reverse view of the embodiment 100 shown in FIG. 1. The animal restraint 200 is comprised of a center panel 202, stretchable panels 204 and 206, rigid bars 208 and 210, an optional neck collar 212, straps 218 and 220, and loops 228. The neck collar 212 may have hook and loop fasteners 214 and 216. Strap 218 may likewise have hook and loop fasteners 222 and 224.

The straps 218 and 220 may be looped around the restrained animal and through the loops 226 and 228, respectively. The straps 218 and 220 may be doubled over so that the hook and loop fasteners may secure the respective straps. Other adjustable and removable fasteners may be used to encircle and secure an animal within the restraint.

The zippered openings 230 and 232 may be manufactured with a flap that may cover the zipper on the side of the restraint 200 that is against the animal. Such a flap may prevent fur or skin of the animal to become entangled with the zipper or other fastener.

Figure 3:
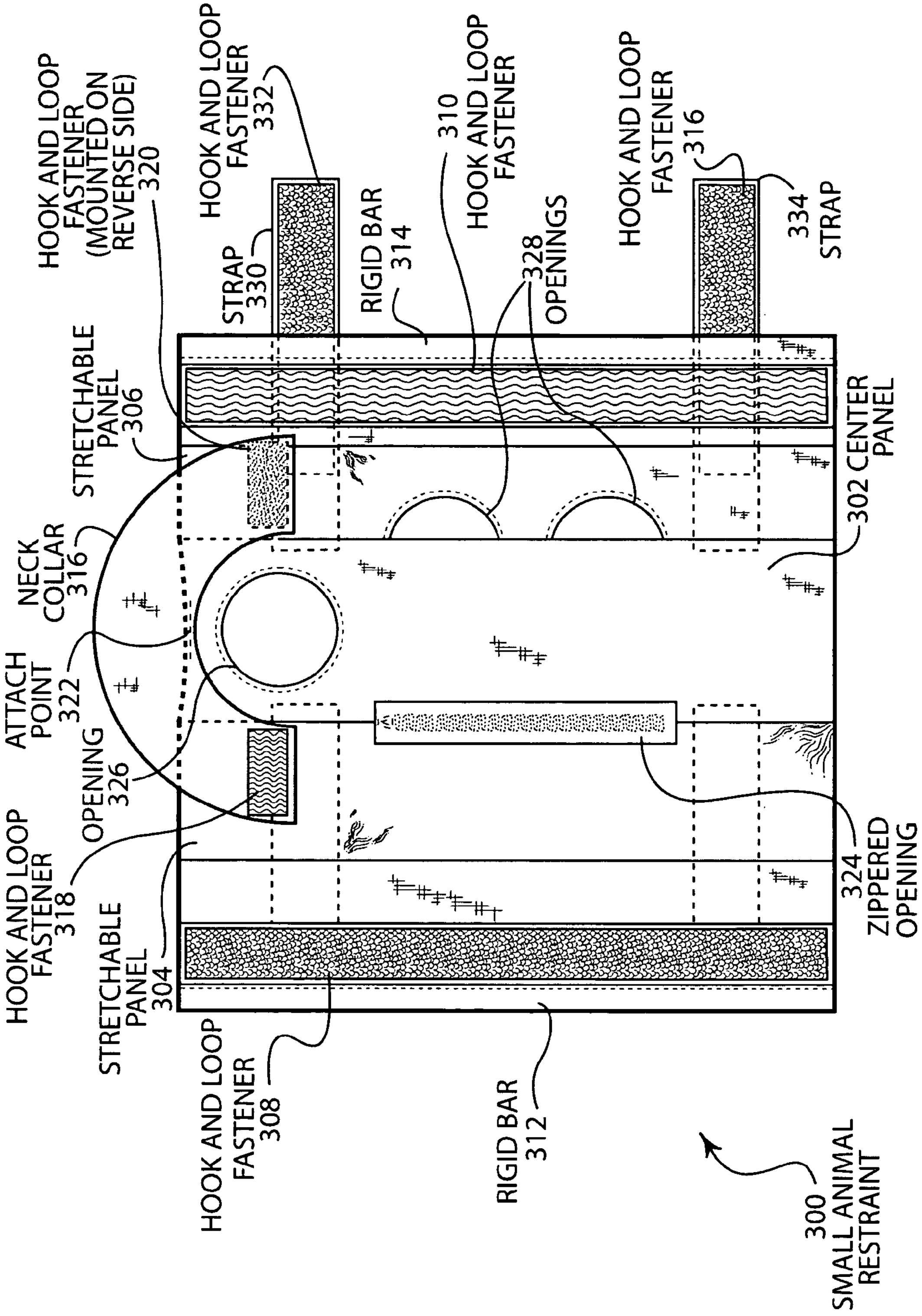
FIG. 3 is an illustration of a second embodiment of the present invention of an animal restraint.

FIG. 3 illustrates a second embodiment 300 of the present invention of an animal restraint. A center panel 302 is attached to stretchable panels 304 and 306. Hook and loop fasteners 308 and 310 are attached near rigid bars 312 and 314. A semi-circular neck collar 316 is attached at attachment point 322 and may be fastened around an animal's neck using hook and loop fasteners 318 and 320. A zippered opening 324 and openings 328 may be used to access portions of a restrained animal.

Openings 328 may be holes cut into one or more of the various panels that make up the restraint. The holes may be of any shape as necessary to perform various procedures on an animal. Those skilled in the art will appreciate that various shapes, sizes, fastening techniques, and locations of access points or openings may be used while keeping within the spirit and intent of the present invention.

Figure 4:
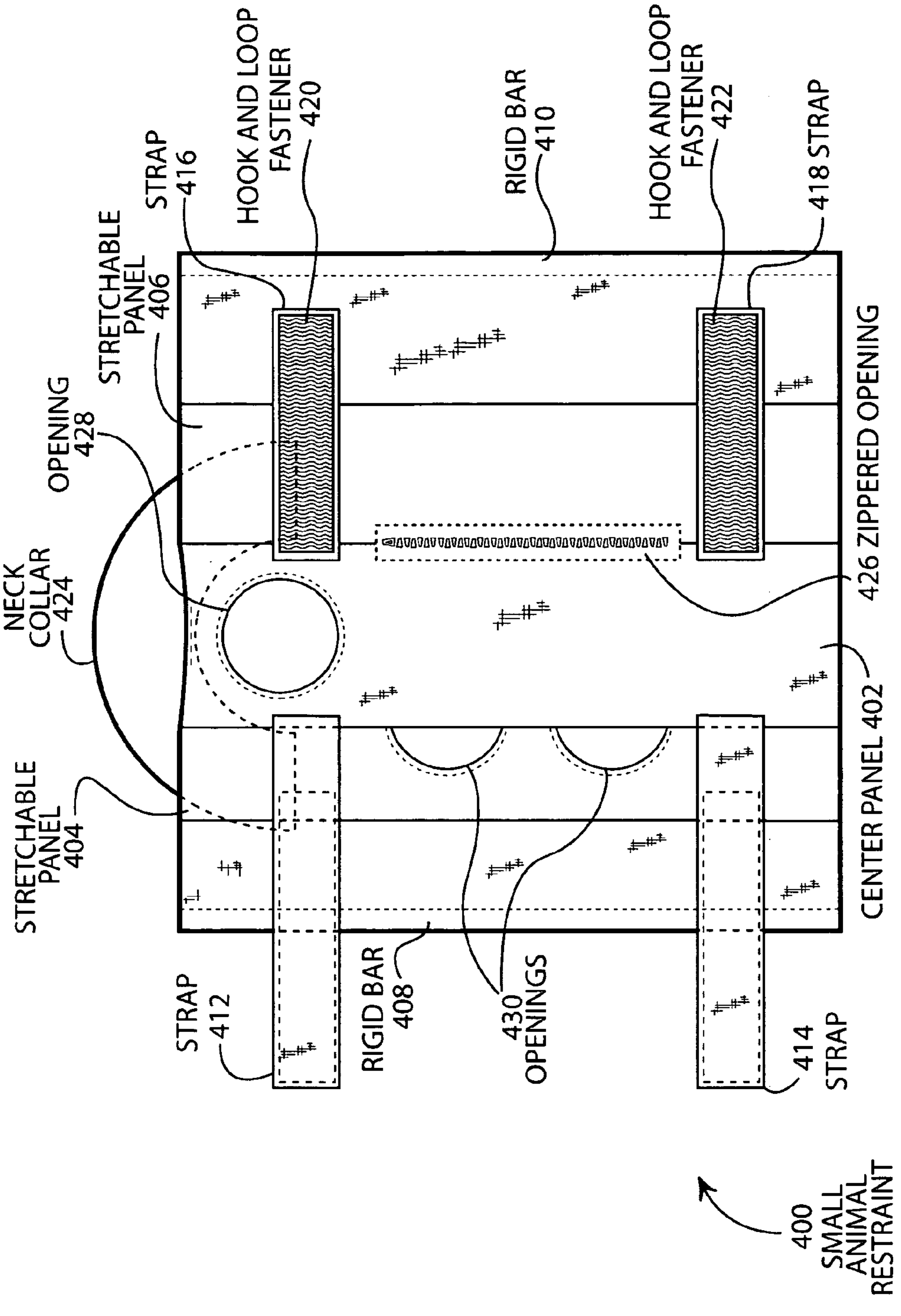
FIG. 4 is an illustration of a reverse view of the embodiment shown in FIG. 3.

FIG. 4 illustrates a bottom view of the embodiment shown in FIG. 3. Embodiment 400 comprises a center panel 402, stretchable panels 404 and 406, rigid bars 408 and 410, straps 412, 414, 416, and 418, and optional semi-circular collar 424.

The strap 416 may be outfitted with hook and loop fastener 420 with a complementary hook and loop fastener attached to strap 412. The strap 412 may be wrapped around a restrained animal and secured with the strap 416.

The opening 428 may be used for gaining access to the back of a restrained animal for various procedures.

Figure 5:
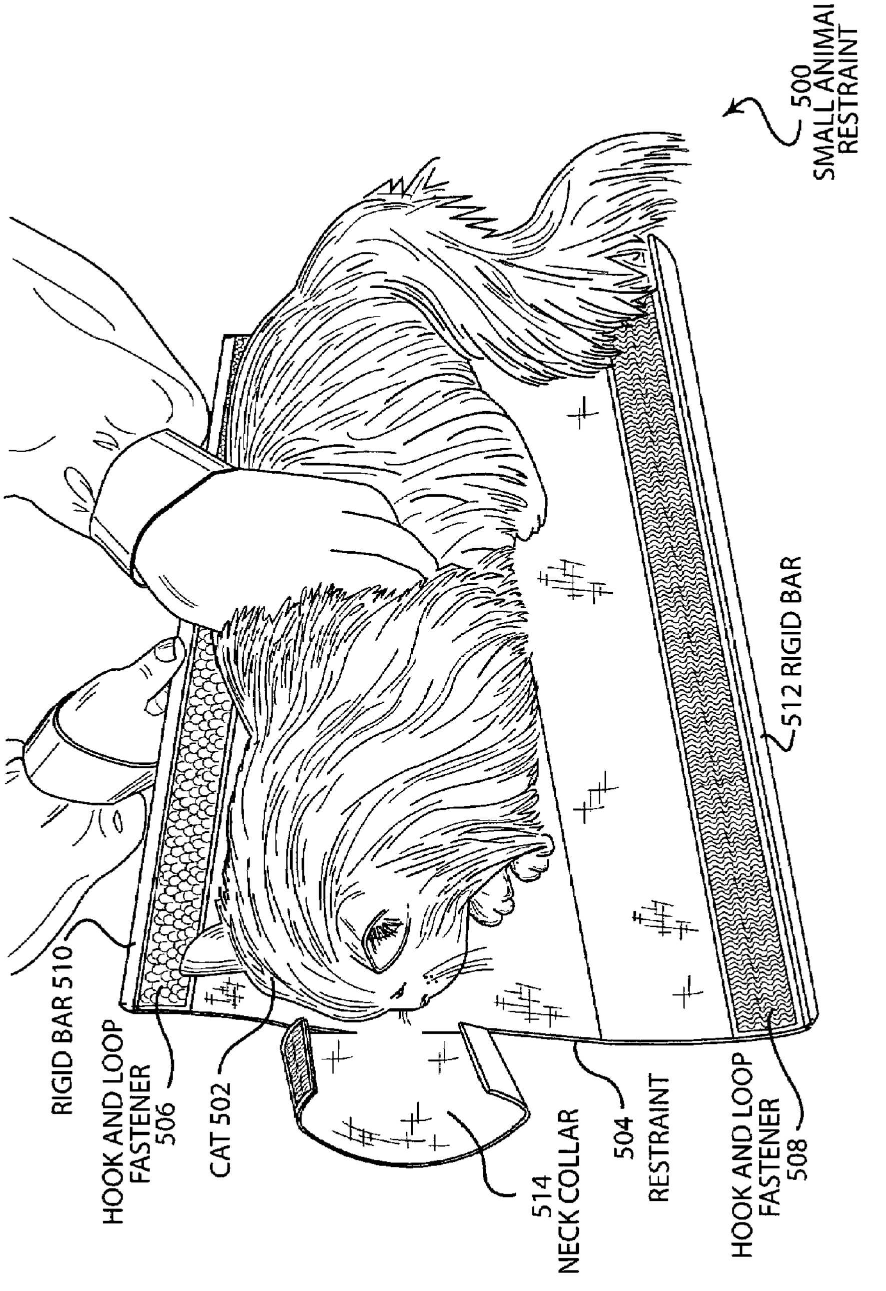
FIG. 5 is an illustration of an embodiment of an animal restraint being used prior to securely restraining a cat.

FIG. 5 illustrates an embodiment 500 of an animal restraint being used prior to securely restraining a cat 502. The cat 502 is placed on top of the restraint 504. The restraint 504 comprises hook and loop fasteners 506 and 508. The rigid bars 510 and 512 may be used to quickly engage the hook and loop fasteners 506 and 508. After the animal is initially restrained, the neck collar 514 may be fitted around the neck of the cat 502.

The embodiment 504 may be used to quickly restrain the cat 502. The rigid bars 510 and 512 may allow the hook and loop fasteners 506 and 508 to almost immediately engage. The quickness of engagement may allow a person to restrain an animal with a minimum of danger to the animal or the person.

Figure 6:
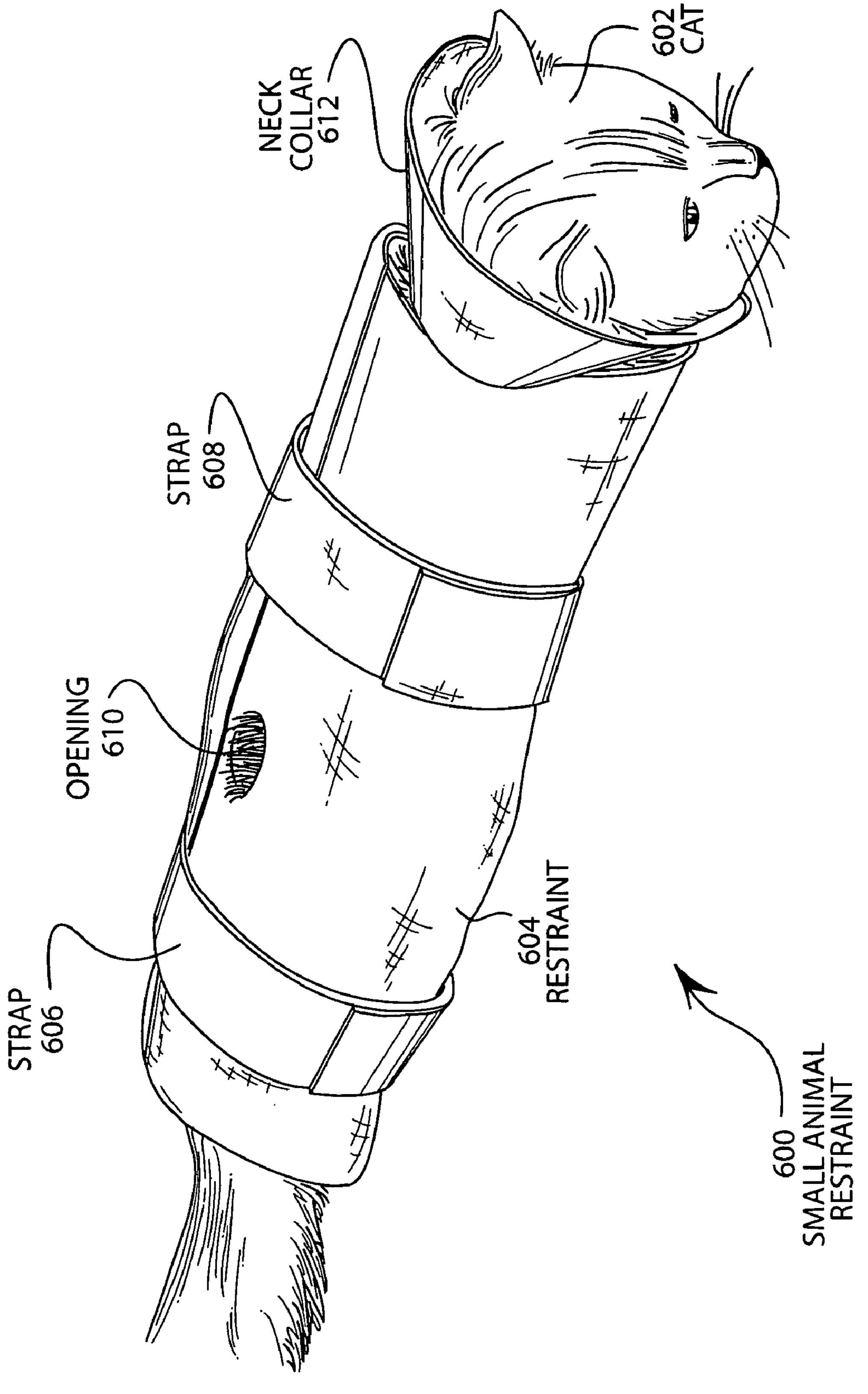
FIG. 6 is an illustration of an embodiment of an animal restraint being used to securely restrain a cat.

FIG. 6 illustrates an embodiment 600 of an animal restraint being used to securely restrain a cat 602. The restraint 604 fully encircles and snugly restrains the cat 602 using the stretchable material. The straps 606 and 608 offer a second mechanism of restraint, ensuring that the cat 602 does not struggle free. The collar 612 is fitted to the neck of the cat 602.

The animal 602 is fully restrained in FIG. 6. The legs of the animal 602 may be securely held so that the animal 602 cannot struggle. The opening 610 may be used to perform a procedure on the animal 602. For example, a wound may be accessible through the opening 610 and may be cleaned and dressed without danger to the animal or the person performing the procedure. In other examples, a subcutaneous or intravenous injection may be administered to the animal 602. In still another example, the animal 602 may be anesthetized and surgery may be performed through the opening 610.

The neck collar 612 may prevent the animal 602 from struggling free. On some embodiments, the particular animal may not be suited to a neck collar 612 or the neck collar 612 may interfere with a planned procedure. In such cases, the neck collar 612 may be removed or not provided in the particular embodiment.

The present invention provides a restraint wherein an animal may be restrained quickly, safely and effectively. The rigid bars provided on the edges of the otherwise flexible and stretchable restraint allow the restraint to very quickly encapsulate and restrain an animal with a minimum of stress placed on the animal. Further, the animal may be quickly prohibited from struggling and inflicting injury to itself or to people who may be attempting to help the animal. Once the animal is encapsulated with the stretchable material, the animal may be handled by a person without risk of injury. Various apertures may be used to gain access to various portions of the animal while keeping the animal restrained and free from injury.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An animal restraint comprising:
- a flexible panel having a first edge and a second edge, said first edge and second edge being substantially parallel, said flexible panel comprising an elastically stretchable portion;
- a first elongated rigid member disposed in a pocket in said flexible panel along at least a portion of said first edge;
- a second elongated rigid member disposed in a pocket in said flexible panel along at least a portion of said second edge; and
- a fastener system having a first portion attached to said flexible panel substantially adjacent to said first elongated rigid member and between said first elongated rigid member and said elastically stretchable portion and a second portion of said fastener system attached to said flexible panel substantially adjacent to said second elongated rigid member and between said second elongated rigid member and said elastically stretchable portion.

2. The restraint of claim 1 wherein said flexible panel has an aperture adapted to allow access to the exterior of said animal when said animal is restrained in said restraint.

3. The restraint of claim 2 wherein said aperture comprises a closure means.

4. The restraint of claim 3 wherein said closure means comprises a zipper.

5. The restraint of claim 3 wherein said closure means comprises a hook and loop fastener.

6. The restraint of claim 1 further comprising a neck collar restraint attached to said flexible panel.

7. The restraint of claim 6 wherein said neck collar restraint comprises two flaps adapted to be secured with a fastener means.

8. The restraint of claim 7 wherein at least one of said flaps comprises a flexible plastic sheet.

9. The restraint of claim 8 wherein said flexible plastic sheet is adapted to be replaceable.

10. The restraint of claim 1 further comprising an engagement mechanism adapted to secure said first portion and said second portion of said fastener system when said first portion and said second portion are engaged.

11. The restraint of claim 10 wherein said engagement mechanism comprises:
- a strap connected to said flexible panel; and
- a loop connected to said flexible panel and adapted to receive said strap through said loop.

12. The restraint of claim 1 wherein said fastener system comprises a hook and loop fastener system.

13. The restraint of claim 1 wherein said fastener system comprises a snap fastener system.

14. A restraint for an animal comprising:
- means for encircling a substantial portion of the body of said animal, said means for encircling comprising an elastically stretchable portion;
- means for rigidly supporting a first edge of said means for encircling, said means for rigidly supporting said first edge being disposed in a pocket along a substantial portion of said first edge;
- means for rigidly supporting a second edge of said means for encircling, said means for rigidly supporting said second edge being disposed in a pocket along a substantial portion of said second edge; and
- means for removably securing said first edge of said means for encircling and said second edge of said means for encircling, said means for removably securing being between each of said means for rigidly supporting and said elastically stretchable portion.

15. The restraint of claim 14 comprising a means for accessing a portion of said animal through said means for encircling.

16. The restraint of claim 15 wherein said means for accessing comprises an open state and a closed stated state and a means for securing said means for accessing in a closed state.

17. The restraint of claim 14 further comprising a means for securing a neck of said animal.

18. The restraint of claim 17 wherein said means for securing a neck is adaptable to different sizes.

19. A method for restraining an animal comprising:
- placing said animal onto a restraint comprising a flexible panel having a first edge and a second edge, said first edge and second edge being substantially parallel, said flexible panel comprising an elastically stretchable portion, a first elongated rigid member disposed in a pocket along at least a portion of said first edge, a second elongated rigid member disposed in a pocket along at least a portion of a second edge, and a fastener system having a first portion attached to said flexible panel substantially adjacent to said first elongated rigid member and between said first elongated rigid member and said elastically stretchable portion and a second portion of said fastener system attached to said flexible panel substantially adjacent to said second elongated rigid member and between said second elongated rigid member and said elastically stretchable portion; and fastening said first portion of said fastener system to said second portion of said fastener system to restrain said animal.

20. The method of claim 19 wherein said restraint further comprises a neck collar restraint attached to said flexible panel and wherein said method further comprises engaging the neck of said animal.

21. The method of claim 19 wherein said restraint further comprises an engagement mechanism adapted to secure said first portion and said second portion of said fastener system when said first portion and said second portion are engaged and wherein said method further comprising engaging said engagement mechanism.

22. A restraint for securing an animal comprising:

a flexible panel having a first edge and a second edge, said flexible panel comprising an elastically stretchable portion, said flexible panel being large enough to capture at least the body and legs of said animal;

a first elongated rigid member attached to said flexible panel along at least a portion of said first edge;

a second elongated rigid member attached to said flexible panel along at least a portion of said second edge; and a fastener system having a first portion attached to said flexible panel substantially adjacent to said first elongated rigid member and between said first elongated rigid member and said elastically stretchable portion and a second portion of said fastener system attached to said flexible panel substantially adjacent to said second elongated rigid member and between said second elongated rigid member and said elastically stretchable portion.

* * * * *